US008495347B2

(12) United States Patent
Dickens et al.

(10) Patent No.: US 8,495,347 B2
(45) Date of Patent: Jul. 23, 2013

(54) CONTROL PROTOCOL FOR IMAGE ENUMERATION AND TRANSFER (75) Inventors: Christopher Scott Dickens, Issaquah, WA (US); Asad Yaqoob, Redmond, WA (US); Saad Syed, Kirkland, WA (US)

(73) Assignee: Microsoft Corporation, Redmond, WA (US)

( * ) Notice: Subject to any disclaimer, the term of this patent is extended or adjusted under 35 U.S.C. 154(b) by 494 days.

(21) Appl. No.: 12/562,961

(22) Filed: Sep. 18, 2009

(65) Prior Publication Data
US 2010/0011203 A1 Jan. 14, 2010

Related U.S. Application Data (62) Division of application No. 11/358,489, filed on Feb. 21, 2006, now Pat. No. 7,631,175.

(51) Int. Cl.
*G06F 15/177* (2006.01)
*G06F 9/00* (2006.01)

(52) U.S. Cl.
USPC .................................. 713/1; 713/2; 709/221

(58) Field of Classification Search
USPC .................................................... 713/2
See application file for complete search history.

(56) References Cited

U.S. PATENT DOCUMENTS

| 5,933,631 A | 8/1999 | Mealey et al. |
| 5,948,101 A * | 9/1999 | David et al. ........... 713/2 |
| 6,499,031 B1 | 12/2002 | Hopmann et al. |
| 6,505,268 B1 | 1/2003 | Schultz et al. |
| 6,681,323 B1 * | 1/2004 | Fontanesi et al. ......... 713/1 |
| 6,751,658 B1 * | 6/2004 | Haun et al. .............. 709/222 |
| 6,807,558 B1 | 10/2004 | Hassett et al. |
| 6,816,964 B1 | 11/2004 | Suzuki et al. |
| 6,975,631 B1 | 12/2005 | Kastenholz |
| 6,988,193 B2 * | 1/2006 | French et al. ............. 713/2 |
| 6,993,642 B2 * | 1/2006 | Burkhardt et al. ......... 713/1 |
| 7,069,428 B2 * | 6/2006 | Miyamoto et al. ......... 713/1 |
| 7,085,921 B2 * | 8/2006 | Frye, Jr. .................. 713/1 |
| 7,089,300 B1 * | 8/2006 | Birse et al. ............... 709/221 |
| 7,246,148 B1 | 7/2007 | Phillips et al. |
| 7,251,725 B2 | 7/2007 | Loison et al. |

(Continued)

FOREIGN PATENT DOCUMENTS

JP 2002169694 6/2002

OTHER PUBLICATIONS

Cowan, Paul, 3Com Corporation, Santa Clara, CA, "What is PXE?", White Paper Intel PXE Presentation, Apr. 1998, 8 pgs.

(Continued)

*Primary Examiner* — Suresh Suryawanshi
(74) *Attorney, Agent, or Firm* — Merchant & Gould PC (57) ABSTRACT A control protocol is used to deploy and install an operating system image on a client. The data structure of the control protocol includes an operation code corresponding to an operation associated with the deployment and installation of the operating system image on the client. When a server receives a request packet from the client, the server parses the request packet and sends the parsed request packet to a provider. The provider then executes the operation associated with the operation code and generates a return value. The return value is sent to the server. The server then composes a reply packet including the return value and transmits the reply packet to the client.

19 Claims, 7 Drawing Sheets

U.S. PATENT DOCUMENTS

| | | |
|---|---|---|
| 7,305,561 B2 | 12/2007 | Hunt et al. |
| 7,330,118 B2 | 2/2008 | Durham et al. |
| 7,398,382 B2 | 7/2008 | Rothman et al. |
| 7,467,295 B2 | 12/2008 | Erickson |
| 7,506,151 B2 * | 3/2009 | Miyamoto et al. ........... 713/2 |
| 7,506,335 B1 * | 3/2009 | Wooff et al. ........... 717/173 |
| 7,546,448 B2 | 6/2009 | Dickens et al. |
| 7,574,592 B2 | 8/2009 | Dicken et al. |
| 7,631,038 B2 | 12/2009 | Dickens et al. |
| 7,631,175 B2 | 12/2009 | Dickens et al. |
| 7,802,084 B2 * | 9/2010 | Fitzgerald et al. ........... 713/2 |
| 2002/0073303 A1 * | 6/2002 | French et al. ........... 713/1 |
| 2002/0097686 A1 | 7/2002 | Qiu |
| 2002/0120721 A1 | 8/2002 | Eilers et al. |
| 2002/0184398 A1 | 12/2002 | Orenshteyn |
| 2002/0198972 A1 | 12/2002 | Babbit et al. |
| 2003/0005096 A1 | 1/2003 | Paul et al. |
| 2003/0055911 A1 | 3/2003 | Peterson |
| 2003/0131152 A1 | 7/2003 | Erlingsson |
| 2004/0019630 A1 | 1/2004 | Burbeck et al. |
| 2004/0081104 A1 | 4/2004 | Pan et al. |
| 2005/0180326 A1 | 8/2005 | Goldflam et al. |
| 2005/0195820 A1 | 9/2005 | Betts et al. |
| 2006/0131390 A1 | 6/2006 | Kim |
| 2006/0143432 A1 | 6/2006 | Rothman et al. |
| 2007/0083748 A1 | 4/2007 | Erickson et al. |
| 2007/0157016 A1 | 7/2007 | Dayan et al. |
| 2008/0046708 A1 | 2/2008 | Fitzgerald et al. |

OTHER PUBLICATIONS

U.S. Appl. No. 11/358,761, Amendment and Response filed Dec. 11, 2008, 10 pgs.

U.S. Appl. No. 11/358,761, Notice of Allowance mailed Mar. 31, 2009, 10 pgs.

U.S. Appl. No. 11/358,761, Office Action mailed Sep. 11, 2008, 13 pgs.

U.S. Appl. No. 11/358,479, Notice of Allowance mailed Sep. 23, 2009, 11 pgs.

U.S. Appl. No. 11/358,479, Office Action mailed Feb. 24, 2009, 13 pgs.

U.S. Appl. No. 11/358,489, Amendment and Response filed Nov. 3, 2008, 13 pgs.

U.S. Appl. No. 11/358,489, Amendment and Response filed Jul. 10, 2009, 7 pgs.

U.S. Appl. No. 11/358,489, Notice of Allowance mailed Jul. 27, 2009, 6 pgs.

U.S. Appl. No. 11/358,489, Office Action mailed Apr. 22, 2009, 9 pgs.

U.S. Appl. No. 11/358,489, Office Action mailed Aug. 1, 2008, 11 pgs.

U.S. Appl. No. 11/358,479, Amendment and Response filed May 26, 2009, 12 pgs.

U.S. Appl. No. 11/358,243, Amendment and Response filed Oct. 29, 2008, 10 pgs.

U.S. Appl. No. 11/358,243, Amendment and Response filed Mar. 24, 2009, 8 pgs.

U.S. Appl. No. 11/358,243, Notice of Allowance mailed Jun. 4, 2009, 4 pgs.

U.S. Appl. No. 11/358,243, Office Action mailed Dec. 24, 2008, 9 pgs.

U.S. Appl. No. 11/358,243, Office Action mailed Jul. 29, 2008, 8 pgs.

* cited by examiner

CONTROL PROTOCOL FOR IMAGE ENUMERATION AND TRANSFER

CROSS-REFERENCE TO RELATED APPLICATIONS

This application is a divisional of U.S. Utility application Ser. No. 11/358,489, filed on Feb. 21, 2006, now U.S. Pat. 7,631,175, which issued Dec. 8, 2009, which is hereby incorporated herein by reference in its entirety.

BACKGROUND

When deploying an operating system to multiple computing devices, it is beneficial to utilize tools to automate the deployment process. For example, in a computing device manufacturing process, an original equipment manufacturer (OEM) typically installs an operating system (OS) with standard configurations or a standard OS in the computing device before a customer purchases it at a retail store or over the Internet. In a corporate setting, a business may need to upgrade a number of identically configured machines simultaneously and efficiently using such automated process.

Typically, the standard OS is deployed and installed automatically to the computing devices by copying or duplicating a pre-determined OS image to the computing device for booting the computing device. For example, the automated deployment and installation process would install the OS with standard configurations on a memory storage area of each of the computing devices via a wired or a wireless connection. Upgrades to OS or other applications may be installed in a similar fashion.

However, with the ongoing advancements and developments in storage media and computing device processing powers, installing a standard set of OS images to a number of computing devices no longer accounts for proper configuration of the computing devices.

One available system, Pre-Boot Execution Environment (PXE) protocol, allows a client to obtain an OS image from a PXE server in a networked environment. The client initiates the PXE process by broadcasting a PXE request in the networked environment. However, any PXE server listening for a request can read and choose to respond to the client. A disadvantage results if more than one PXE server exists in the networked environment because the client will be serviced by whichever PXE server responds the quickest to the client request. For example, if two PXE servers are in the networked environment, the first configured with application logic to service any type of device (e.g. personal computers, point of sale devices, and network servers) and a second configured to service point of sale devices, it is not possible to determine which PXE server will be the first to respond to the request from a point of sale device client. Therefore, using the PXE protocol, it is possible that the point of sale device may incorrectly receive a boot image for a personal computer.

In addition, not only does an entity need to deploy an OS on a number of different classes of computing devices, from personal digital assistants (PDAs), to server computers, to point of sale terminals, the entity also needs to consider that each class of the computing devices may require particular configurations due to hardware components. For example, a PDA "X" with a chip having a processing power of 500 MHz and a storage memory capacity of 5 GB may require a different OS image from another PDA "Y" in the same production line with a chip having a processing power of 733 MHz and a storage memory capacity of 10 GB. As such, the existing OS image deployment systems that install an OS with standard configuration or a standard OS image would not properly configure the PDA "Y" because both PDA "X" and PDA "Y" would receive the same OS image for booting the devices. In addition, current OS image deployment systems lack the ability to properly detect differences in hardware components in the computing devices to efficiently deploy and install appropriate OS images to the computing devices.

By way of further example, in existing OS boot image file deployment systems, the server responds to the request by sending a standard or a predetermined OS boot image file to the client. For example, suppose the clients sending the requests include computing devices with 32-bit architecture and computing devices with 64-bit architecture. Current deployment systems would, regardless of the different computing architecture configurations, respond to the request by sending a generic or standard OS boot image file. Thus, all clients, either with 32-bit or 64-bit architecture, would receive the same boot image file (e.g., a 32-bit boot image file). As such, under current deployment systems, the computing devices with 64-bit architecture need to perform additional evaluation and detection before sending another request to the server for a more appropriate OS boot image file, the 64-bit OS image, before the computing devices can boot accordingly.

SUMMARY

Embodiments of the invention include methods for a control protocol used to deploy and install an operating system image to a client. When the server receives a request packet associated with deployment and installation of an operating system image from the client, the server parses the request packet and sends the parsed request to a provider. The request packet includes an operation code corresponding to an operation associated with deploying and installing the operating system image. The provider executes the operation associated with an operation code included in the parsed request. Once the provider generates a response to the request, the response is sent to the server. The server then composes a reply packet and sends the reply packet to the client.

This summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

Other features will be in part apparent and in part pointed out hereinafter.

BRIEF DESCRIPTION OF THE DRAWINGS

Corresponding reference characters indicate corresponding parts throughout the drawings.

DETAILED DESCRIPTION

Figure 1:
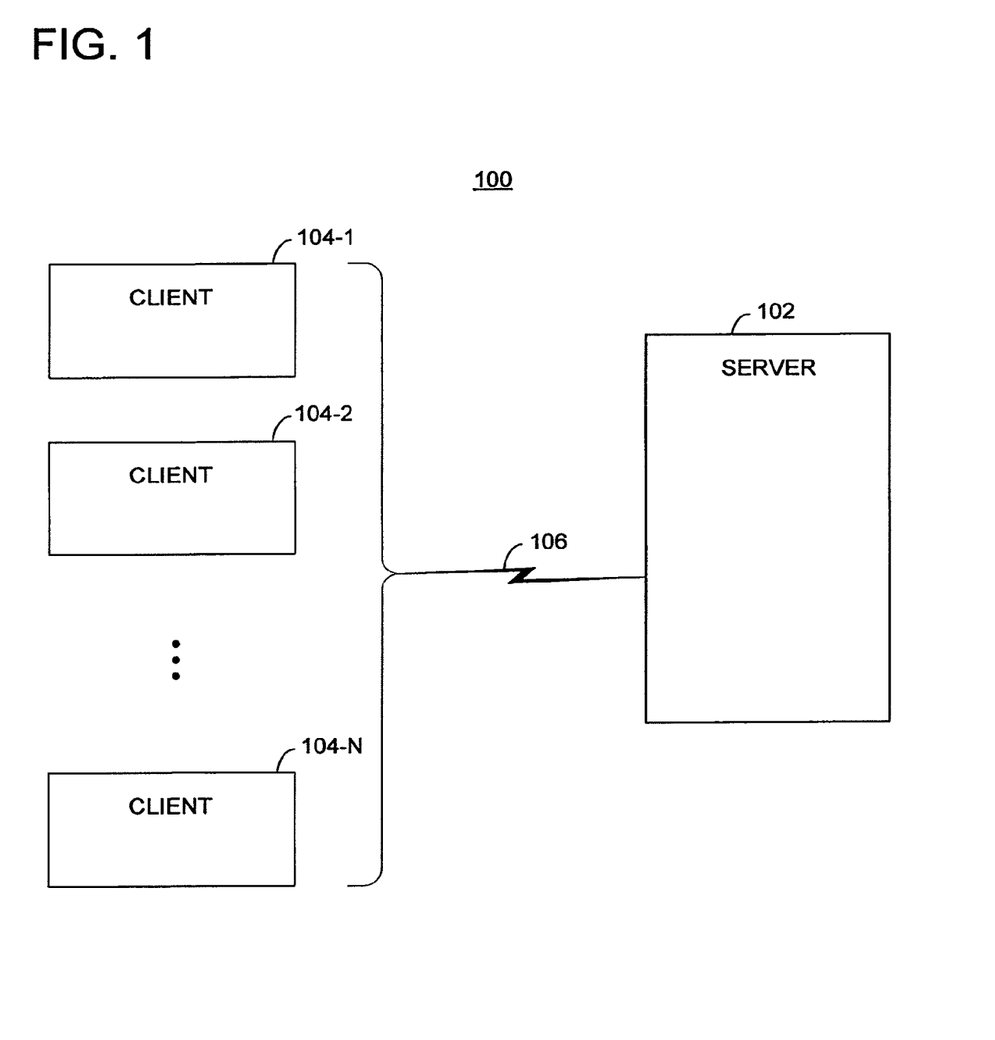
FIG. 1 is a block diagram illustrating an exemplary system for implementing embodiments of the invention.

Referring to FIG. 1, the system 100 illustrates an exemplary embodiment in which aspects of the invention may be implemented. A server 102, which may be one of a plurality of servers, includes components that enable the deployment of an operating system (OS) to a plurality of clients 104 via a networked environment 106. In one embodiment, the server 102 deploys the OS, such as MAC® OS X, UNIX®, Linux®, or Windows Vista® operating systems to the clients 104. The server 102 and the clients 104 may communicate via a number of underlying network transport mechanisms available in the networked environment 106. In one embodiment, the transport mechanisms include, Transmission Control Protocol (TCP), Trivial File Transfer Protocol (TFTP), User Datagram Protocol (UDP), Remote Procedure Call (RPC), File Transfer Protocol (FTP), HyperText Transfer Protocol (HTTP), multicast over any of these protocols or the like. In one example, server 102 in system 100 includes a server 200 described in FIG. 2.

The clients 104 include one or more computing devices, such as a desktop computer, a laptop computer, a personal digital assistant (PDA), or other devices. In another embodiment, server 102 and each of the clients 104 implement at least a part of a computer 130 depicted in FIG. 3.

In one example, system 100 may be used in a pre-boot execution environment (PXE). For example, server 102 may be a PXE server that watches for dynamic host configuration protocol (DHCP) discovery requests, which include a special tag identifying the client as a PXE client. If the discovery request includes the tag, the PXE server replies to the client with configuration information, including the name of a boot image file, which may include an OS boot image, pre-OS image file, pre-boot agents (e.g., computer-executable instructions for scanning clients 104 for viruses before installing an OS). The boot image file may transferred to clients 104 using TFTP, and the transferred file may be used to boot the clients 104.

Figure 2:
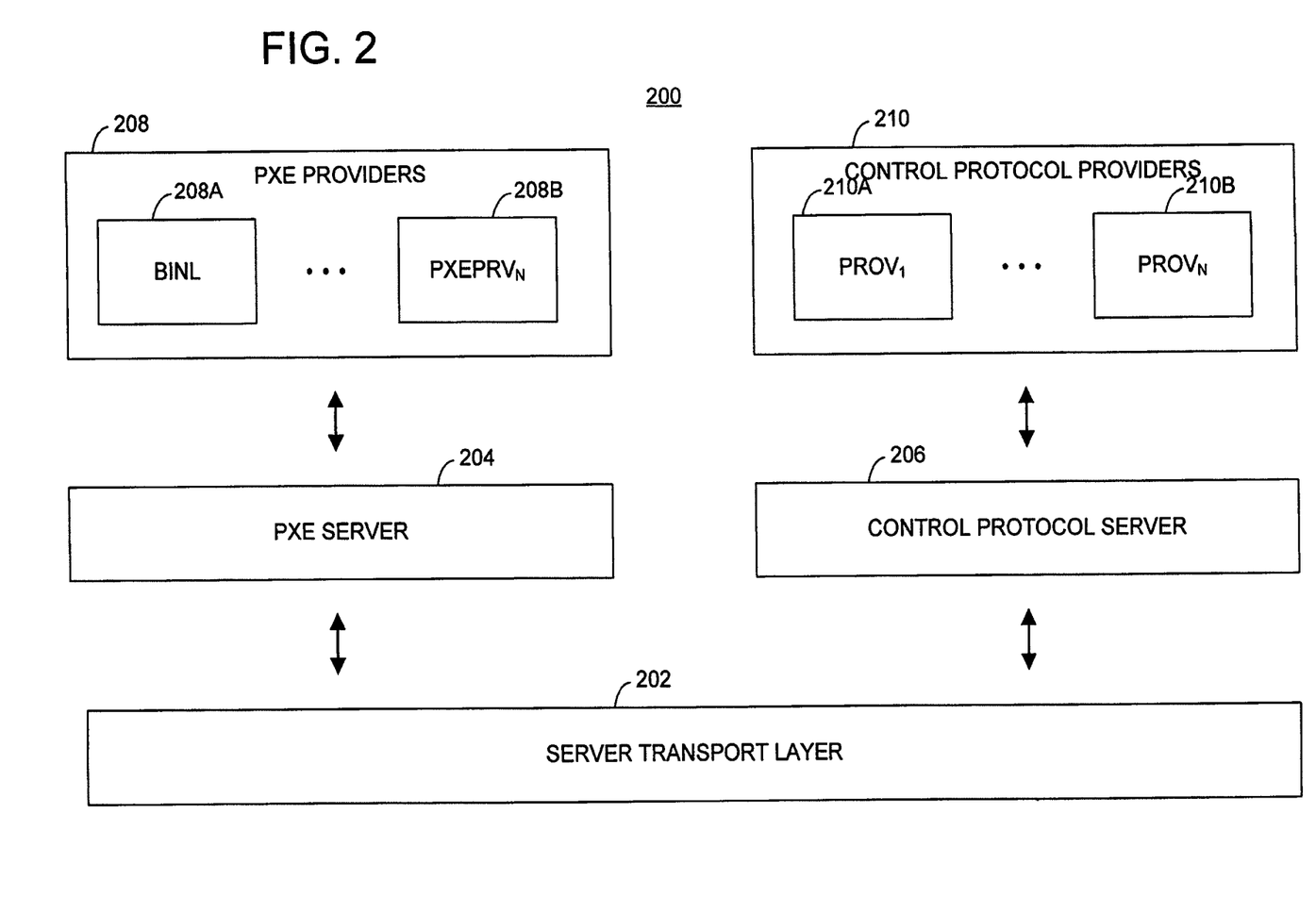
FIG. 2 is a block diagram illustrating an exemplary pre-boot environment according to an embodiment of the invention.

Referring now to FIG. 2, an exemplary embodiment of the server 200 of the invention is shown. The server 200 includes one or more components, such as a transport layer 202, a PXE server 204, and a Control Protocol Server 206. The transport layer 202 handles the details associated with communicating with clients and provides a transport-independent communication mechanism to the PXE Server 204 and the Control Protocol Server 206. In one embodiment, the transport layer 202 may communicate with the clients 104 utilizing a variety of network protocols including Transmission Control Protocol (TCP), User Datagram Protocol (UDP), Remote Procedure Call (RPC), and HyperText Transfer Protocol (HTTP), and multicast over any of theses protocols.

The PXE server 204 accepts PXE requests from the clients 104. PXE is one of the components of the Wired for Management (WfM) specification that allows the clients 104 to boot from the PXE server 204 on a network prior to booting an operating system from a hard drive local to the clients 104. After receiving the PXE request from the client, the PXE server passes the request to a PXE provider 208. The PXE provider 208 is a component containing the application logic to formulate a response to the clients 104. In one embodiment, the PXE provider 208 is Boot Information Negotiation Layer 208A (BINL). The responsibilities of the BINL service 208 include answering the request, querying a directory service on behalf of the clients 104, as well ensuring that the correct policy and configuration settings are applied to the clients 104 during the operating system installation. In another embodiment, the PXE provider 208 includes two or more PXE providers 208, each with distinct application logic.

The Control Protocol Server 206 accepts requests from a reduced operating system environment. The reduced operating system aids in the deployment of the operating system. In one embodiment, the Control Protocol Server 206 accepts Microsoft® Windows® Preinstallation Environment (WinPE) requests. After receiving the request from the clients 104, the Control Protocol Server 206 passes the request to a Control Protocol Provider 210. The Control Protocol Provider 210 is a component containing the application logic to formulate a response to the clients 104. In one embodiment, the Control Protocol Provider 210 includes a plurality of providers, such as 210A, and 210B.

It is also to be understood that additional components connected, wired or wirelessly, to the server 200 may be added to perform operations of the transport layer 202, the PXE server 204, and the control protocol server 206.

Initially, a client (e.g., client 104-1) requests to be booted by a server (e.g., PXE server 204). The request is received by the server, which may be coupled with one or more other servers (e.g., a Control Protocol Server) or PXE providers for responding to the request.

Figure 4:
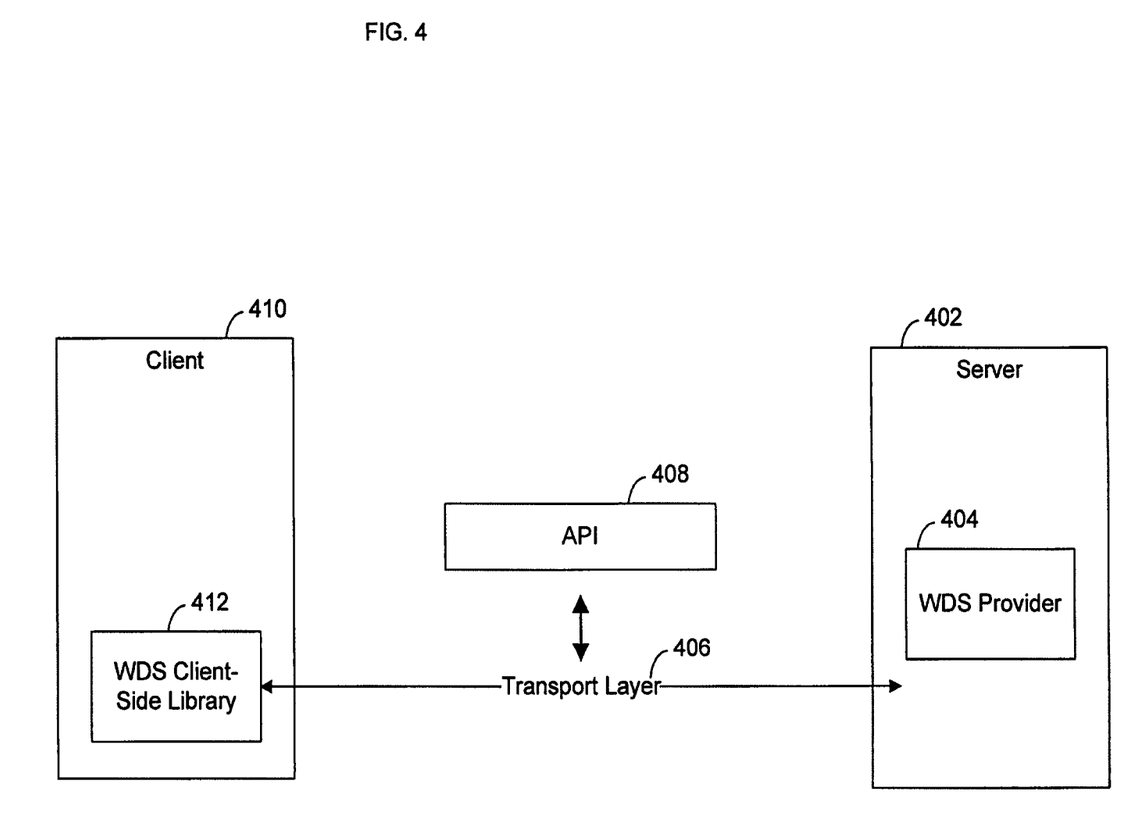
FIG. 4 is a block diagram illustrating an exemplary pre-boot environment according to an embodiment of the invention.

In FIG. 4, the server 402 is configured to deploy an operating system image to the client 410 via a control protocol. In one embodiment the server 402 deploys a Windows® operating system. The server 402 receives a request packet from the client 410. The request packet includes an operation code corresponding to an operation that server 402 is to perform. Operations are related to selecting and installing an operating system image on the client 410. The server 402 parses the request packet and sends the parsed request to a provider 404. The provider 404 executes the operation and formulates a response. The provider 404 then sends the response to the server 402. The server 402 composes a reply packet including the received response and sends the reply packet to the client 410.

The client 410 receives a library of functions 412 from the server 402. The library of functions 412 allow the client 410 to communicate with the server 402 via the control protocol. In one embodiment the library includes functions to initialize the data structure, create the data structure, parse the received data structure, release the data structure, add a variable to the data structure, and delete a variable from the data structure.

In one embodiment, the control protocol allows for the transportation of data related to all facets of the operating system image deployment, including image metadata, the image data itself, and unattended information. For example, it is common for organizations to place operating system images on a network share on a server. To install these images, the client machines boot to gain network access via PXE or other bootable media (e.g., CDROM, DVD, or floppy) to connect to the network share containing the operating system images. Once connected, the client machine may discover what operating system images are available on the share, select an appropriate operating system image to install, and install the appropriate operating system image via the control protocol. The data transmitted over the control protocol may include the types of operating system images that are available on the share (image enumeration), the properties of the operating system images (image metadata), adjunct files to the operating system image (like unattended setup files), and the operating system image itself.

In one embodiment, the control protocol is independent of the underlying transport layer, so that there is flexibility in the type of solution that one could implement. For example, suppose the underlying transport is HTTP (HyperText Transfer Protocol). Utilizing the control protocol, a web application may be developed that directs boot clients on the Internet via a web page to a centrally located server. From there, the operating system image enumeration and transport could occur via HTTP. In another example, suppose a datacenter contains a thousand machines that need to install operating system images concurrently. The underlying transport protocol of the control protocol is implemented in unicast. The control protocol can be used to drive a multicast transport protocol to transfer the operating system images. Thus, the multicast transport protocol, such as multicast over TFTP (Trivial File Transfer Protocol), may be used to transfer the operating system image to save available bandwidth while installing the operating system image files on the machines.

An application programming interface (API) 408 is built on the control protocol. The control protocol is session-less and session management is built on top of the control protocol. Additionally, the control protocol is built on a client driven request-response model. The control protocol abstracts a transport layer 406 from the API layer 408. Thus, if a new network protocol is implemented in the transport layer 406, no changes will need to be made to the API layer 408. Excerpts from an exemplary (API) for the control protocol is shown in Appendix A.

The transport layer 406 is responsible for handling details associated with communicating with a client 410 and provides a transport-independent communication mechanism to control protocol server 402. In one embodiment, the transport layer can support one or more network protocols including TFTP (Trivial File Transfer Protocol), Transmission Control Protocol (TCP), User Datagram Protocol (UDP), remote procedure call (RPC), and HyperText Transfer Protocol (HTTP).

In one embodiment the library of functions 412 provides functions to client 410 to construct control protocol request packets, to send control protocol packets to the server 402, and to parse control protocol reply packets received from the server 402. Because the control protocol is session-less, the library does not include functions for session management. The library of functions provides functions to server 402 to parse control protocol request packets received from the client 410, to construct control protocol reply packets, and to send control protocol reply packets to the client 410. Excerpts from an exemplary (API) for the control protocol is shown in Appendix A.

Figure 5:
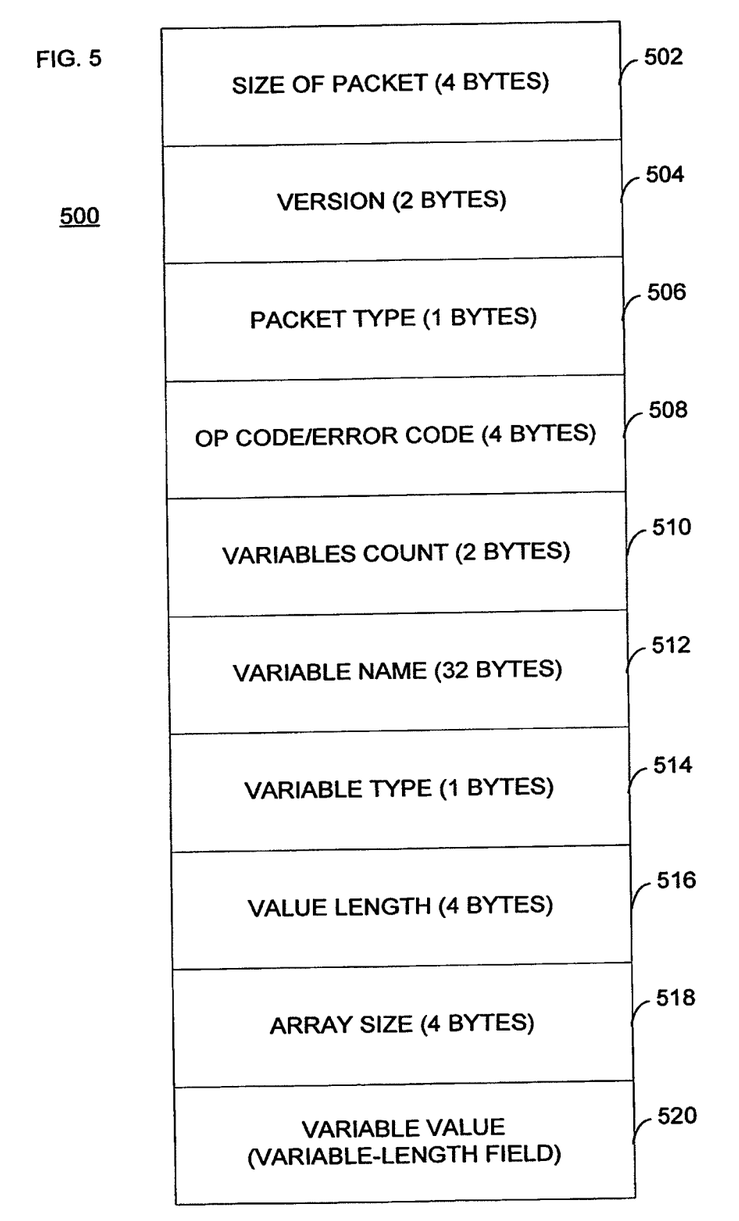
FIG. 5 is an exemplary diagram of a data structure of an embodiment of the invention.

In FIG. 5, an exemplary data structure of a packet 500 of the control protocol is shown. The packet 500 includes fixed fields 502, 504, 506, 508, 510 and variable fields 512, 514, 516, 518, 520. The fixed fields are included with every packet 500. The variable fields are associated with zero or more parameters required for executing the operation indicated by the operation code represented by the code value stored in the packet 500 at 508. A set of variable fields 512, 514, 516, 518, 520 is included in the packet for each required parameter.

At 502, a total size of the packet in bytes is stored. At 504, a version number of the control protocol is stored. At 506, an indicator is stored, indicating whether the packet is a request packet or a reply packet. If a request packet is indicated at 506, then a code value representing an operation code corresponding to an operation to be performed by server is stored at 508. If a reply packet is indicated at 506, then a return value of the operation performed by the server is stored at 508. Below is one example of operation codes being defined at a provider that utilizes the control protocol:

```
typedef enum
{
    WDS_OP_SESSION_CREATE = 1,
    WDS_OP_IMG_ENUMERATE,           // 2
    WDS_OP_LOG_INIT,    // 3,
    WDS_OP_LOG_MSG, // 4
    WDS_OP_GET_CLIENT_UNATTEND,     // 5
    WDS_OP_GET_UNATTEND_VARIABLES   // 6
};
```

The packet 500 may contain variable fields associated with zero or more parameters. The number of parameters contained in the packet 500 is stored at 510. The parameters are the arguments required by the operation. A value representing the name of the parameter is stored at 512. A value representing the type of the parameter is stored at 514. In one embodiment a parameter may be one of the following types: C type unsigned long integer, C type unsigned short integer, C type byte, C type long unsigned 64-bit integer, C type pointer to NULL terminated ANSI string, C type pointer to a NULL terminated Unicode string, and C type pointer to a memory location which contains raw data.

A value representing the length of the parameter is stored at 516. A value representing the size of the array, if the parameter is an array, is stored at 518. A value representing the value of the parameter is stored at 520.

The fields 512, 514, 516, 518, 520 associated with a parameter are repeated in order for each parameter included in the packet 500. For example, if the number of parameters 510 in the packet 500 is two, then the fields 512, 514, 516, 518, 520 associated with the first parameter will be added in order to the packet 500. The fields 512, 514, 516, 518, 520 associated with the second parameter will be added to the packet 500 after the fields associated with the first parameter.

Figure 6:
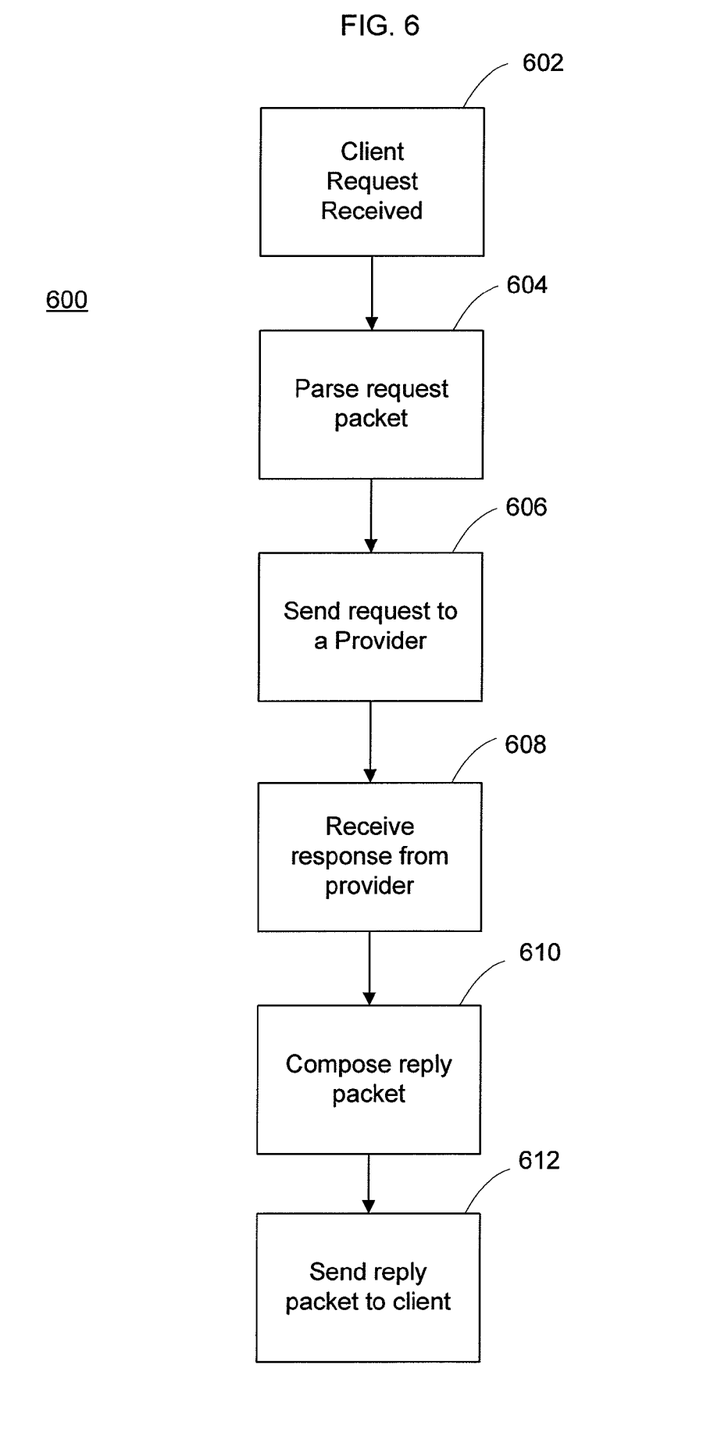
FIG. 6 is an exemplary flow diagram of a method of processing client requests of one embodiment of the invention.

In FIG. 6, an embodiment of the control protocol server is shown. In operation, at 602, the server receives a request packet from the client. At 604, the server parses the request packet. At 606, the server sends the parsed request to the provider. The provider performs the operation requested by the client and formulates a response. The server receives the provider response at 608. At 610, the server composes a reply packet including the received response. At 612, the reply packet is sent to the client.

Figure 7:
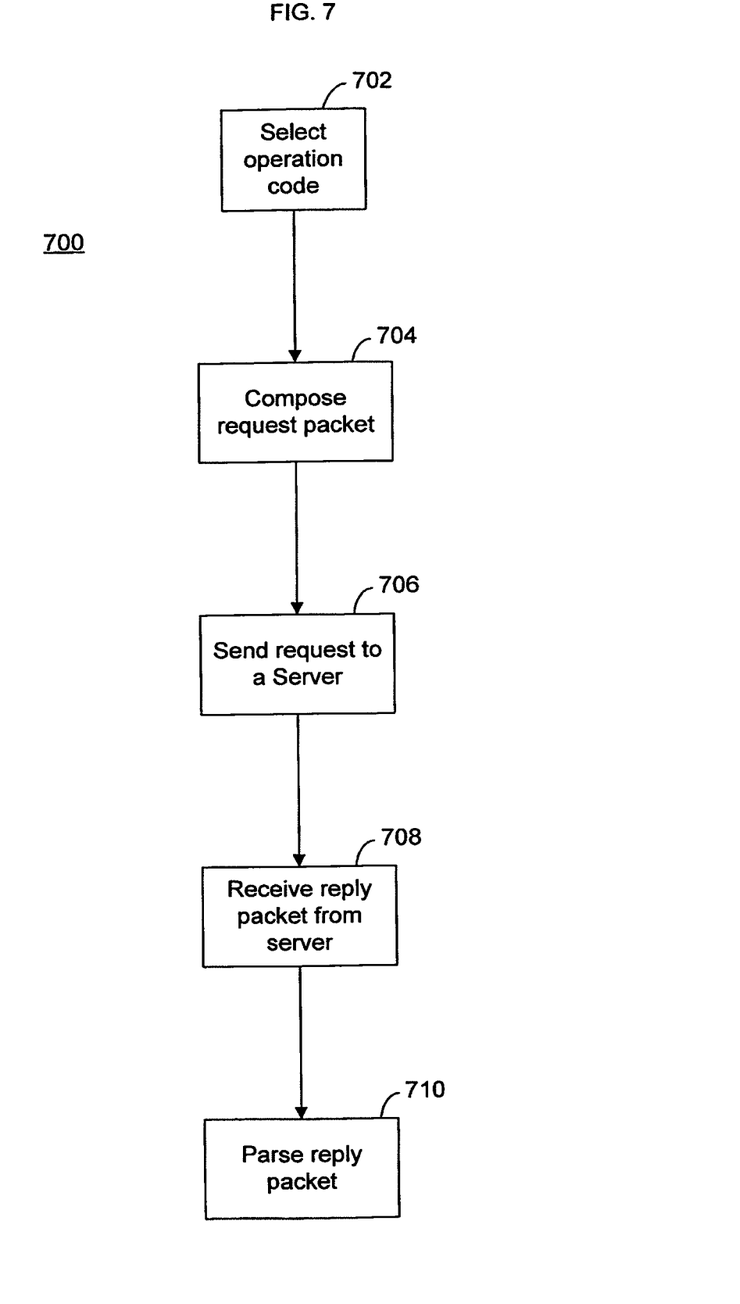
FIG. 7 is an exemplary flow diagram of a method of creating client requests in a pre-boot environment according to an embodiment of the invention.

In FIG. 7, an embodiment of the control protocol client is shown. In operation, at 702, the client identifies an operation code corresponding to an operation to be performed on the control protocol server. At 704, the client composes a request packet including the identified operation code. At 706, the client sends the request packet to the server. The client receives the reply packet at 708, the reply packet including a return value indicating the result of the requested operation. At 710, the client parses the reply packet.

Figure 3:
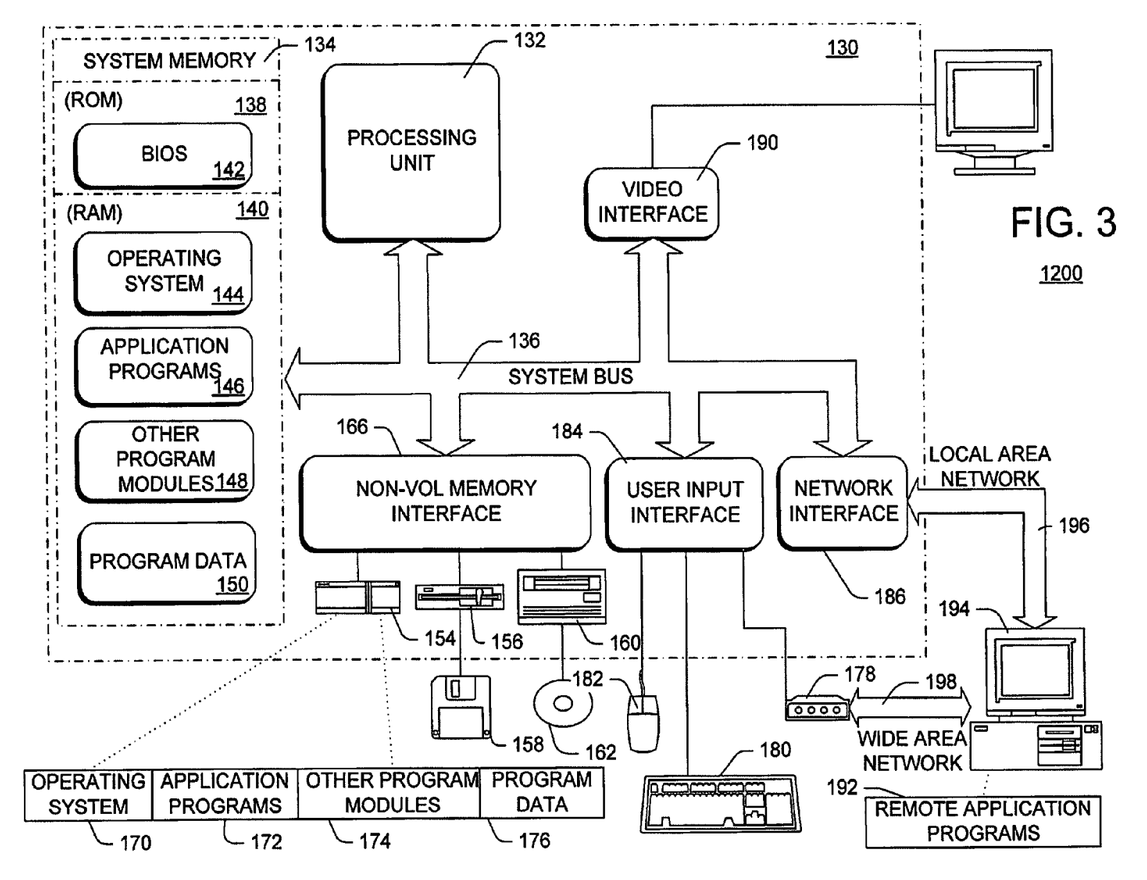
FIG. 3 is a block diagram illustrating one example of a suitable computing system environment in which the invention may be implemented.

Referring now to FIG. 3, one embodiment of a general purpose computing device in the form of a computer 130 is illustrated. A computer such as the computer 130 is suitable for use in the other figures illustrated and described herein, such as FIG. 1. Computer 130 has one or more processors or processing units 132 and a system memory 134. In the illustrated embodiment, a system bus 136 couples various system components, including the system memory 134 to the processors 132. The bus 136 represents one or more of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus also known as Mezzanine bus.

The computer 130 typically has at least some form of computer readable media. Computer readable media, which include both volatile and nonvolatile media, removable and non-removable media, may be any available medium that may be accessed by computer 130. By way of example and not limitation, computer readable media comprise computer storage media and communication media. Computer storage media include volatile and nonvolatile, removable and non-removable media implemented in any method or technology for storage of information such as computer readable instructions, data structures, program modules or other data. For example, computer storage media include RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium that may be used to store the desired information and that may be accessed by computer 130. Communication media typically embody computer readable instructions, data structures, program modules, or other data in a modulated data signal such as a carrier wave or other transport mechanism and include any information delivery media. Those skilled in the art are familiar with the modulated data signal, which has one or more of its characteristics set or changed in such a manner as to encode information in the signal. Wired media, such as a wired network or direct-wired connection, and wireless media, such as acoustic, RF, infrared, and other wireless media, are examples of communication media. Combinations of any of the above are also included within the scope of computer readable media.

The system memory 134 includes computer storage media in the form of removable and/or non-removable, volatile and/or nonvolatile memory. In the illustrated embodiment, system memory 134 includes read only memory (ROM) 138 and random access memory (RAM) 140. A basic input/output system 142 (BIOS), containing the basic routines that help to transfer information between elements within computer 130, such as during start-up, is typically stored in ROM 138. RAM 140 typically contains data and/or program modules that are immediately accessible to and/or presently being operated on by processing unit 132. By way of example, and not limitation, FIG. 3 illustrates operating system 144, application programs 146, other program modules 148, and program data 150.

The computer 130 may also include other removable/non-removable, volatile/nonvolatile computer storage media. For example, FIG. 3 illustrates a hard disk drive 154 that reads from or writes to non-removable, nonvolatile magnetic media. FIG. 3 also shows a magnetic disk drive 156 that reads from or writes to a removable, nonvolatile magnetic disk 158, and an optical disk drive 160 that reads from or writes to a removable, nonvolatile optical disk 162 such as a CD-ROM or other optical media. Other removable/non-removable, volatile/nonvolatile computer storage media that may be used in the exemplary operating environment include, but are not limited to, magnetic tape cassettes, flash memory cards, digital versatile disks, digital video tape, solid state RAM, solid state ROM, and the like. The hard disk drive 154, and magnetic disk drive 156 and optical disk drive 160 are typically connected to the system bus 136 by a non-volatile memory interface, such as interface 166.

The drives or other mass storage devices and their associated computer storage media, discussed above and illustrated in FIG. 3, provide storage of computer readable instructions, data structures, program modules, and other data for the computer 130. In FIG. 3, for example, hard disk drive 154 is illustrated as storing operating system 170, application programs 172, other program modules 174, and program data 176. Note that these components may either be the same as or different from operating system 144, application programs 146, other program modules 148, and program data 150. Operating system 170, application programs 172, other program modules 174, and program data 176 are given different numbers here to illustrate that, at a minimum, they are different copies.

A user may enter commands and information into computer 130 through input devices or user interface selection devices such as a keyboard 180 and a pointing device 182 (e.g., a mouse, trackball, pen, or touch pad). Other input devices (not shown) may include a microphone, joystick, game pad, satellite dish, scanner, or the like. These and other input devices are connected to processing unit 132 through a user input interface 184 that is coupled to system bus 136, but may be connected by other interface and bus structures, such as a parallel port, game port, or a Universal Serial Bus (USB). A monitor 188 or other type of display device is also connected to system bus 136 via an interface, such as a video interface 190. In addition to the monitor 188, computers often include other peripheral output devices (not shown) such as a printer and speakers, which may be connected through an output peripheral interface (not shown).

The computer 130 may operate in a networked environment using logical connections to one or more remote computers, such as a remote computer 194. The remote computer 194 may be a personal computer, a server, a router, a network PC, a peer device or other common network node, and typically includes many or all of the elements described above relative to computer 130. The logical connections depicted in FIG. 3 include a local area network (LAN) 196 and a wide area network (WAN) 198, but may also include other networks. LAN 136 and/or WAN 138 may be a wired network, a wireless network, a combination thereof, and so on. Such networking environments are commonplace in offices, enterprise-wide computer networks, intranets, and global computer networks (e.g., the Internet).

When used in a local area networking environment, computer 130 is connected to the LAN 196 through a network interface or adapter 186. When used in a wide area networking environment, computer 130 typically includes a modem 178 or other means for establishing communications over the WAN 198, such as the Internet. The modem 178, which may be internal or external, is connected to system bus 136 via the user input interface 184, or other appropriate mechanism. In a networked environment, program modules depicted relative to computer 130, or portions thereof, may be stored in a remote memory storage device (not shown). By way of example, and not limitation, FIG. 3 illustrates remote application programs 192 as residing on the memory device. The network connections shown are exemplary and other means of establishing a communications link between the computers may be used.

Generally, the data processors of computer 130 are programmed by means of instructions stored at different times in the various computer-readable storage media of the computer. Programs and operating systems are typically distributed, for example, on floppy disks or CD-ROMs. From there, they are installed or loaded into the secondary memory of a computer. At execution, they are loaded at least partially into the computer's primary electronic memory. Aspects of the invention described herein include these and other various types of computer-readable storage media when such media contain instructions or programs for implementing the steps described below in conjunction with a microprocessor or other data processor. Further, aspects of the invention include the computer itself when programmed according to the methods and techniques described herein.

For purposes of illustration, programs and other executable program components, such as the operating system, are illustrated herein as discrete blocks. It is recognized, however, that such programs and components reside at various times in different storage components of the computer, and are executed by the data processor(s) of the computer.

Although described in connection with an exemplary computing system environment, including computer 130, embodiments of the invention are operational with numerous other general purpose or special purpose computing system environments or configurations. The computing system environment is not intended to suggest any limitation as to the scope of use or functionality of any aspect of the invention. Moreover, the computing system environment should not be interpreted as having any dependency or requirement relating to any one or combination of components illustrated in the exemplary operating environment. Examples of well-known computing systems, environments, and/or configurations that may be suitable for use with aspects of the invention include, but are not limited to, personal computers, server computers, hand-held or laptop devices, multiprocessor systems, microprocessor-based systems, set top boxes, programmable consumer electronics, mobile telephones, network PCs, minicomputers, mainframe computers, distributed computing environments that include any of the above systems or devices, and the like.

Embodiments of the invention may be described in the general context of computer-executable instructions, such as program modules, executed by one or more computers or other devices. Generally, program modules include, but are not limited to, routines, programs, objects, components, and data structures that perform particular tasks or implement particular abstract data types. Aspects of the invention may also be practiced in distributed computing environments where tasks are performed by remote processing devices that are linked through a communications network. In a distributed computing environment, program modules may be located in both local and remote computer storage media including memory storage devices.

An interface in the context of a software architecture includes a software module, component, code portion, or other sequence of computer-executable instructions. The interface includes, for example, a first module accessing a second module to perform computing tasks on behalf of the first module. The first and second modules include, in one example, application programming interfaces (APIs) such as provided by operating systems, component object model (COM) interfaces (e.g., for peer-to-peer application communication), and extensible markup language metadata interchange format (XMI) interfaces (e.g., for communication between web services).

The interface may be a tightly coupled, synchronous implementation such as in Java 2 Platform Enterprise Edition (J2EE), COM, or distributed COM (DCOM) examples. Alternatively or in addition, the interface may be a loosely coupled, asynchronous implementation such as in a web service (e.g., using the simple object access protocol). In general, the interface includes any combination of the following characteristics: tightly coupled, loosely coupled, synchronous, and asynchronous. Further, the interface may conform to a standard protocol, a proprietary protocol, or any combination of standard and proprietary protocols.

The interfaces described herein may all be part of a single interface or may be implemented as separate interfaces or any combination therein. The interfaces may execute locally or remotely to provide functionality. Further, the interfaces may include additional or less functionality than illustrated or described herein.

In operation, computer 130 executes computer-executable instructions such as those illustrated in the figures to implement aspects of the invention.

The order of execution or performance of the operations in embodiments of the invention illustrated and described herein is not essential, unless otherwise specified. That is, the operations may be performed in any order, unless otherwise specified, and embodiments of the invention may include additional or fewer operations than those disclosed herein. For example, it is contemplated that executing or performing a particular operation before, contemporaneously with, or after another operation is within the scope of aspects of the invention.

Embodiments of the invention may be implemented with computer-executable instructions. The computer-executable instructions may be organized into one or more computer-executable components or modules. Aspects of the invention may be implemented with any number and organization of such components or modules. For example, aspects of the invention are not limited to the specific computer-executable instructions or the specific components or modules illustrated in the figures and described herein. Other embodiments of the invention may include different computer-executable instructions or components having more or less functionality than illustrated and described herein.

When introducing elements of aspects of the invention or the embodiments thereof, the articles "a," "an," "the," and "said" are intended to mean that there are one or more of the elements. The terms "comprising," "including," and "having" are intended to be inclusive and mean that there may be additional elements other than the listed elements.

As various changes could be made in the above constructions, products, and methods without departing from the scope of aspects of the invention, it is intended that all matter contained in the above description and shown in the accompanying drawings shall be interpreted as illustrative and not in a limiting sense.

APPENDIX A

Excerpts from an exemplary application programming interface for the control protocol is shown below.
WdsClientExecute
Sends a request to server for execution and returns the reply from server.

```
DWORD
WDSAPI
WdsClientExecute(
    WDS_CRED *pCred,
    WDS_ENDPOINT *pLocalEndpoint,
    WDS_ENDPOINT *pRemoteEndpoint,
    PVOID pPacket,
    ULONG uPacketLen,
    PVOID *ppReply,
```

```
        ULONG *puReplyLen,
        WDS_CLIENT_OP *pOp
    );
```

Parameters:

pCred

[in] This parameter is only used when using an authenticated channel to communicate with the server. If this parameter is NULL, then the credentials of the current thread are used; to use different credentials, pass-in the user name, password and domain name using this parameter.

pLocalEndpoint

[in] Specifies local endpoint to use for sending a request to the server.

pRemoteEndpoint

[in] Specifies the server on which to execute request.

pPacket

[in] Request packet.

uPacketLen

[in] Length, in bytes, of pPacket.

ppReply

[out] Reply from Server. This memory is allocated by WDSCSL and should be released using WdsClientPacketFree function.

puReplyLen

[out] Contains the length, in bytes, of pReply.

pOp

[in] Used to specify timeout and retry count.

Return Value:

If function is successful, it should return ERROR_SUCCESS. On failure, appropriate Win32 Error Code, as defined in winerror.h, should be returned.

Remarks:

To send a UDP request:

pRemoteEndpoint must be filled in as given below to specify server address.

| Field Name | Meaning |
|---|---|
| uSizeOfStruct | sizeof(WDS_ENDPOINT) |
| Udp.uPort | Specifies the target port on server |
| bAddress/uAddrLen | Specifies server's address |
| Type | WDS_ENDPOINT_UDP |
| All other member must be zero | |

To send UDP request using specific network interface, use pLocalEndpoint:

| Field Name | Meaning |
|---|---|
| uSizeOfStruct | sizeof(WDS_ENDPOINT) |
| Udp.uPort | Specifies the port to use for sending packet. |
| bAddress/uAddrLen | Specifies the IP address of the network interface to use for sending UDP packet. |
| Type | WDS_ENDPOINT_UDP |
| All other member must be zero | |

If caller does not have any preference for network interface, pLocalEndpoint can be set to NULL.

To send an RPC request:

pLocalEndpoint is always set to NULL, and pRemoteEndpoint is used to specify the remote address of server.

| Field Name | Meaning |
|---|---|
| uSizeOfStruct | Size of WDS_ENDPOINT |
| Type | WDS_ENDPOINT_RPC |
| uFlags | WDS_RPC_NOAUTH: Use unauthenticated channel. WDS_RPC_AUTH: For secure and authenticated channel. Current thread's credentials are used to authenticate client on server. |
| Rpc.guid | Target WDS Provider GUID |
| Rpc.Server.wszComputerName | Server Name |
| All other members must be zero | | pOp parameter is used to specify retry count, and timeout value of the request. If this parameter is NULL, request is sent to server once, and waits for INFINITE time for reply.

| Field Name | Meaning |
|---|---|
| uTimeout | Specifies timeout in milliseconds. WDSCSL waits for reply from server for the specified time, and if no reply is received, the request is cancelled. |
| uRetryCount | Number of retries. |

Example

```
WDS_CLIENT_OP Op;
Op.uTimeout = 30 * 1000; // 30 Seconds
Op.uRetryCount = 1; // Retry one more time
...
dwError = WdsClientExecute (&LocalEp,
                &RemoteEp,
                pMyData,
                uDataLen,
                &pReply,
                &uReplyLen,
                &Op);
```

WdsClientPacketAllocate

Allocates a packet.

```
        DWORD
        WDSAPI
        WdsClientPacketAllocate(
            ULONG uSize
        );
```

Parameters:

uSize

[in] Size, in bytes, of memory to allocate.

Return Value:

On success, returns non-NULL pointer to allocate memory. On failure, NULL is returned, use GetLastError( ) to get extended error information.

WdsClientPacketFree

Frees packet allocated using WdsClientPacketAllocate.

```
        DWORD
        WDSAPI
        WdsClientPacketFree(
            PVOID pPacket
        );
```

Parameters:

pPacket

[in] Pointer to allocated memory.

Return Value:

If function is successful, it should return ERROR_SUCCESS. On failure, appropriate Win32 Error Code, as defined in winerror.h, should be returned.

Control Protocol

WDS Control Protocol Library (WDSCPL) provides functions to construct request packets, send them to server, and parse reply. WDSCSL uses WDSCSL to communicate with server, and requires users to initialize WDSCSL before using WDSCPL. WDSCPL should be used on server-end as well to parse the received packets.

WDSCPL Packet Format

| Field Name | Meaning |
|---|---|
| Size of Packet | Size of Packet |
| Version | Control Protocol Version |
| Packet Type | Indicates if the packet is Request or Reply. |
| Op Code/Error Code | For Request Packets: This parameter specifies the type of operation to perform. Client and Server both define the meaning of the Op Codes and what operation needs to be performed for it. For Reply Packet: This contains the Win32 Error Code as a result of execution of client request. |
| Variable Count | Total number of variable/value pairs in packet. |
| Each packet contains any number of Variable/Value pairs | |
| Variable Name | Specifies a NULL terminated variable name. |
| Variable Type | Type of variable (WDSCPL_VAR_xxxx) |
| Value Length | Specifies length, in bytes, of Variable Value for this variable. |
| Variable Value | Value of variable |

Structures

WDSCPL_PACKET_INFO

```
struct WDSCPL_PACKET_INFO
{
    ULONG uSizeOfStruct;
    ULONG uType;
    union
    {
        ULONG uOpCode;
        ULONG uErrorCode;
    };
};
```

| Member Variable | Meaning |
|---|---|
| uSizeOfStruct | Should be set to sizeof(WDSCPL_PACKET_INFO) |
| uType | Specifies type of packet: WDSCPL_PACKET_REQUEST WDSCPL_PACKET_REPLY |
| uOpCode | For WDSCPL_PACKET_REQUEST, it specifies the User-defined Op Code. |
| uErrorCode | For WDSCPL_PACKET_REPLY, it specifies the return value of the execution. |

WDSCPL Packet Function

WDSCPL provides functions to prepare a request and to parse a response. Clients should use these functions and never create the packet by hand or parse the response directly.

WdsCpPacketInitialize

This function is used to initialize a packet which will be sent to server for processing.

```
DWORD
WDSAPI
WdsCpPacketInitialize(
    HANDLE hWdsProvider,
    PWDSCPL_PACKET_INFO pInfo
    HANDLE *phPacket
);
```

Parameters:

hWdsProvider

[in] If WDSCPL is being used by WDS Provider running inside WDS Server, then this parameter should be set to the handle of WDS Provider. For client side applications, this should always be NULL.

pInfo

[in] Specifies information about the type of packet to create.

phPacket

[out] On success, a handle to initialized packet is returned.

Return Value:

If function is successful, it should return ERROR_SUCCESS. On failure, appropriate Win32 Error Code, as defined in winerror.h, should be returned.

Remarks:

When done with packet, it must be freed using WdsCpPacketFree.

WdsCpRecvPacketInitialize

This function is used to initialize a received packet and prepare it for parsing.

```
DWORD
WDSAPI
WdsCpRecvPacketInitialize(
    HANDLE hWdsProvider,
    PVOID pPacket,
    ULONG uPacketLen,
    PWDSCPL_PACKET_INFO pInfo
    HANDLE *phPacket
);
```

Parameters:

hWdsProvider

[in] If WDSCPL is being used by WDS Provider running inside WDS Server, then this parameter should be set to the handle of WDS Provider. For client side applications, this should always be NULL.

pPacket

[in] Pointer to memory containing contents of received packet.

uPacketLen

[in] Length, in bytes, of received packet.

pInfo

[out] On return contains information about packet.

phPacket

[out] On return contains the handle to packet.

Return Value:

WDSCPL validates the received packet and returns a handle which is used to parse out the variables stored in the packet. If the packet is not valid, i.e., invalid header or data, then ERROR_INVALID_DATA is returned.

Remarks:

This function is used by both client and server. Server uses this function to parse the received request from client, and client uses it to parse the reply received from server. When done using the packet, the handle must be released using WdsCpPacketRelease.

WdsCpPacketRelease

This function is used to release a packet once client is done with processing.

```
DWORD
WDSAPI
WdsCpPacketRelease(
    HANDLE hPacket
);
```

Parameters:
hPacket
  [in] Handle to packet.
Return Value:
  If function is successful, it should return ERROR_SUCCESS. On failure, appropriate Win32 Error Code, as defined in winerror.h, should be returned.
Remarks:
  This function releases the packet handle.
  If the handle was returned by WdsCpRecvPacketInitialize then the function only releases the handle; caller is still responsible for releasing the memory of the received packet.
  For WdsCpPacketInitialize, only the handle is released; callers are still required to release any packets returned by WdsCpPacketGetBuffer.

Example

```
dwError = WdsCpPacketInitialize(hWdsHandle, MY_OP_CODE, &hPacket);
if (dwError == ERROR_SUCCESS)
{
    // Do something with packet
    if (WdsCpPacketFree(hPacket) != ERROR_SUCCESS)
    {
        // Handle Error
    }
}
```

WdsCpPacketGetBuffer

This function is used to construct a Control Protocol packet which can be sent to the server for execution.

```
DWORD
WDSAPI
WdsCpPacketGetBuffer(
    HANDLE hPacket,
    PVOID *ppPacket,
    ULONG *puPacketLen
);
```

Parameters:
hPacket
  [in] Handle to packet returned by WdsCpPacketInitialize.
ppPacket
  [out] On success, contains pointer to memory which contains the Control Packet data. When this memory is no loner needed, it should be free'ed using WdsClientPacketFree (for client-side) or WdsPacketFree (for server-side).
puPacketLen
  [out] On success, contains the length, in bytes, of returned packet.
Return Value:
  If function is successful, it should return ERROR_SUCCESS. On failure, appropriate Win32 Error Code, as defined in winerror.h, should be returned.
Remarks:
  Callers use this function when they have added all the required parameters and want to send the required parameters to server.
WdsCpParameterAdd
  Adds a variable to packet, and returns memory pointer where value can be stored.

```
PVOID
WDSAPI
WdsCpParameterAdd (
    HANDLE hPacket,
    LPCWSTR pwszName,
    ULONG uVarType,
    ULONG uElemLength,
    ULONG uArraySize
);
```

Parameters:
hPacket
  [in] Handle to packet returned by WdsCpPacketInitialize.
pwszName
  [in] Variable Name to add.
VarType
  [in] Type of variable to add.
uElemLength
  [in] For variable length data types, this parameter specifies the length, in bytes, of variable. For fixed length data types, it is ignored.
uArraySize
  [in] For array variables, this parameter specifies the total number of elements to allocate for array. For non-array variables, this parameter is ignored.
Return Value:
  If function is successful, it returns a pointer to allocated memory where the value can be stored by using the returned pointer. In case of an error, NULL is returned; callers should use GetLastError( ) to determine the cause of failure.
Remarks:
  Adds a variable to the packet. WDSCPL supports basic data types, and allows addition of BLOBs.
  The following values are supported for VarType:

| Type | Meaning |
|---|---|
| WDSCPL_VAR_ULONG | C Type: ULONG<br>Fixed Length |
| WDSCPL_VAR_USHORT | C Type: USHORT<br>Fixed Length |
| WDSCPL_VAR_BYTE | C Type: BYTE<br>Fixed Length |
| WDSCPL_VAR_ULONG64 | C Type: ULONG64<br>Fixed Length |

| Type | Meaning |
|---|---|
| WDSCPL_VAR_STRING | C TYPE: char* Pointer to NULL terminated Ansi string. uLength specifies the amount of memory, in bytes, to allocate and return. |
| WDSCPL_VAR_WSTRING | C TYPE: WCHAR* Pointer to NULL terminated Unicode string. uLength specifies the amount of memory, in bytes, to allocate and return. |
| WDSCPL_VAR_BLOB | C Type: PVOID Pointer to memory location which contains raw data which should be copied into the packet. uLength parameter specifies the number of bytes to copy. |

Variable types can be ORed with these flags:

| Type | Meaning |
|---|---|
| WDSCPL_VAR_ARRAY | To create an array of base type. |

Examples

Adds a simple ULONG variable:

```
ULONG *pValue = NULL;
...
pValue = WdsCpParameterAdd(hPacket,
        L"MyVariable",
        WDSCPL_VAR_ULONG,
        0, // Fixed length type
        0);
If (pValue == NULL)
{
    // Handle Error
}
*pValue = 100;
```

Adds an array of ULONG:

```
ULONG *pValue = NULL;
...
pValue = WdsCpParameterAdd(hPacket,
        L"MyVariable",
        WDSCPL_VAR_ULONG | WDSCPL_VAR_ARRAY,
        0, // Fixed length type
        20);
If (pValue == NULL)
{
    // Handle Error
}
for(int i = 0; i < 20; i++)
pValue[i] = 100 + i;
```

Following adds an array of BLOBs:

```
struct MyType
{
    Int a, b, c, d;
};
...
MyType *pValue = NULL;
pValue = WdsCpParameterAdd(hPacket,
        L"MyVariable",
        WDSCPL_VAR_BLOB | WDSCPL_VAR_ARRAY,
        sizeof(MyType),
        15);
If (pValue == NULL)
{
    // Handle Error
}
```

WdsCpParameterDelete
Deletes a variable from the packet.

```
DWORD
WDSAPI
WdsCpParameterDelete(
    HANDLE hPacket,
    LPCWSTR pwszName
);
```

Parameters:
hPacket
    [in] Handle to packet returned by WdsCpPacketInitialize.
pwszName
    [in] Variable Name to add.
Return Value:
    If function is successful, it should return ERROR_SUCCESS. On failure, appropriate Win32 Error Code, as defined in winerror.h, should be returned.
WdsCpParameterValidate
    Validates a variable in the packet.

```
DWORD
WdsCpParameterValidate(
    HANDLE hPacket,
    LPCWSTR pwszName,
    ULONG uExpectedType,
    ULONG uMinElemLen,
    ULONG uMaxElemLen,
    ULONG uMinArraySize,
    ULONG uMaxArraySize
);
```

Parameters:
hPacket
    [in] Handle to packet returned by WdsCpPacketInitialize.
pwszName
    [in] Variable Name.
uExpectedType
    [in] Expected type of variable.
uMinElemLen
    [in] For fixed length data types, this parameter is ignored and element length is calculated by WDSCPL. For variable length data types, this parameter specifies the minimum acceptable length of an element of a variable.
uMaxElemLen
    [in] For fixed length data types, this parameter is ignored and element length is calculated by WDSCPL. For variable length data types, this parameter specifies the maximum acceptable length of an element of a variable.
uMinArraySize
    [in] For array data types, specifies the minimum acceptable array size; ignored otherwise.
uMaxArraySize
    [in] For array data types, specifies the maximum acceptable array size; ignored otherwise.

Return Value:
If all checks are validated, ERROR_SUCCESS is returned. ERROR_INVALID_DATA is returned if specified checks fail.

Remarks:
This function is used by developers to verify a variable type, length and array size using just one function call.

WdsCpParameterQuery
Returns length and type of given variable.

```
DWORD
WdsCpParameterQuery(
    HANDLE hPacket,
    LPCWSTR pwszName,
    ULONG *puType,
    ULONG *puElemLength,
    ULONG *puArraySize,
    PVOID *ppValuePtr
);
```

Parameters:
hPacket
  [in] Handle to packet returned by WdsCpPacketInitialize.
pwszName
  [in] Variable Name.
puType
  [out] Optional parameter which is filled with type of variable.
puLength
  [out] Optional parameter which is filled with element length, in bytes, of variable.
puArraySize
  [out] Optional parameter which is filled with number of elements in array. If the variable is not an array, then this parameter is set to zero.
ppValuePtr
  [out] Optional parameter which is filled with the pointer to the value of variable.

Return Value:
If function success, it should return ERROR_SUCCESS. On failure, appropriate Win32 Error Code, as defined in winerror.h, should be returned.

What is claimed is:

1. A computer-implemented method for selecting and installing an operating system image on one or more clients, the computer-implemented method comprising:
  receiving a request packet from a client of the one or more clients requesting installation and deployment of an operating system image;
  parsing the request packet to identify an operation code included in the request packet, wherein the operation code specifies an operation;
  forwarding the parsed request packet to a provider;
  receiving a response from the provider, wherein the response includes a result of executing the operation specified by the operation code, and wherein the result of executing the operation comprises:
    selecting the operating system image for the client; and
    providing policy and configuration settings for installing the appropriate operating system image on the client;
  constructing a reply packet, wherein the reply packet comprises the response received from the provider; and
  sending the reply packet to the client.

2. The computer-implemented method of claim 1, further comprising:
  utilizing a control protocol for sending and receiving control protocol packets, wherein the control protocol provides a library of functions for parsing a control protocol request packet, for constructing a control protocol reply packet, and for sending a control protocol reply packet to the client.

3. The computer-implemented method of claim 2, wherein each control protocol packet comprises:
  one or more fixed fields, wherein the one or more fixed fields are included in each control protocol packet; and
  one or more variable fields, wherein the one or more variable fields are associated with one or more parameters required to execute the operation.

4. The computer-implemented method of claim 3, wherein each of the one or more parameters corresponds to an argument required to execute the operation.

5. The computer-implemented method of claim 1, wherein a pre-boot execution environment (PXE) server receives the request packet from the client.

6. The computer-implemented method of claim 1, wherein the parsed request packet is forwarded to a pre-boot execution environment (PXE) provider.

7. The computer-implemented method of claim 6, wherein the PXE provider is a Boot Information Negotiation Layer (BINL) service.

8. A computer system for selecting and installing an operating system image on one or more clients, the computer system comprising:
  one or more processing units; and
  at least one system memory, communicatively coupled to the one or more processing units and containing instructions that, when executed by the one or more processing units, perform a method comprising:
  receiving a request packet from a client of the one or more clients requesting installation and deployment of an operating system image;
  parsing the request packet to identify an operation code included in the request packet, wherein the operation code specifies an operation;
  forwarding the parsed request packet to a provider;
  receiving a response from the provider, wherein the response includes a result of executing the operation specified by the operation code, and wherein the result of executing the operation comprises:
    selecting the operating system image for the client; and
    providing policy and configuration settings for installing the appropriate operating system image on the client;
  constructing a reply packet, wherein the reply packet comprises the response received from the provider; and
  sending the reply packet to the client.

9. The computer system of claim 8, further comprising:
  utilizing a control protocol for sending and receiving control protocol packets, wherein the control protocol provides a library of functions for parsing a control protocol request packet, for constructing a control protocol reply packet, and for sending a control protocol reply packet to the client.

10. The computer system of claim 9, wherein each control protocol packet comprises:
  one or more fixed fields, wherein the one or more fixed fields are included in each control protocol packet; and
  one or more variable fields, wherein the one or more variable fields are associated with one or more parameters required to execute the operation.

11. The computer system of claim 10, wherein each of the one or more parameters corresponds to an argument required to execute the operation.

12. The computer system of claim 8, wherein a pre-boot execution environment (PXE) server receives the request packet from the client.

13. The computer system of claim 8, wherein the parsed request packet is forwarded to a pre-boot execution environment (PXE) provider.

14. The computer system of claim 13, wherein the PXE provider is a Boot Information Negotiation Layer (BINL) service.

15. A computer-implemented method for requesting selection and installation of an operating system image, the computer-implemented method comprising:
   identifying an operation code, wherein the operation code specifies an operation;
   constructing a request packet requesting installation and deployment of an operating system image, wherein the request packet includes the operation code;
   sending the request packet to the server;
   receiving a reply packet from the server, wherein the reply packet includes a result of an execution of the operation and an operating system image that was identified based on the execution of the operation, and wherein the execution of the operation is performed by a provider; and
   receiving installation of the identified operating system image based on the execution of the operation.

16. The computer-implemented method of claim 15, further comprising:
   utilizing a control protocol for sending and receiving control protocol packets, wherein the control protocol provides a library of functions for constructing a control protocol request packet, for sending the control protocol request packet to the server, and for parsing a control protocol reply packet.

17. The computer-implemented method of claim 16, wherein each control protocol packet comprises:
   one or more fixed fields, wherein the one or more fixed fields are included in each control protocol packet; and
   one or more variable fields, wherein the one or more variable fields are associated with one or more parameters required to execute the operation.

18. The computer-implemented method of claim 17, wherein each of the one or more parameters corresponds to an argument required to execute the operation.

19. The computer-implemented method of claim 15, wherein the request packet is sent to a pre-boot execution environment (PXE) server.

* * * * *